Figure 1:
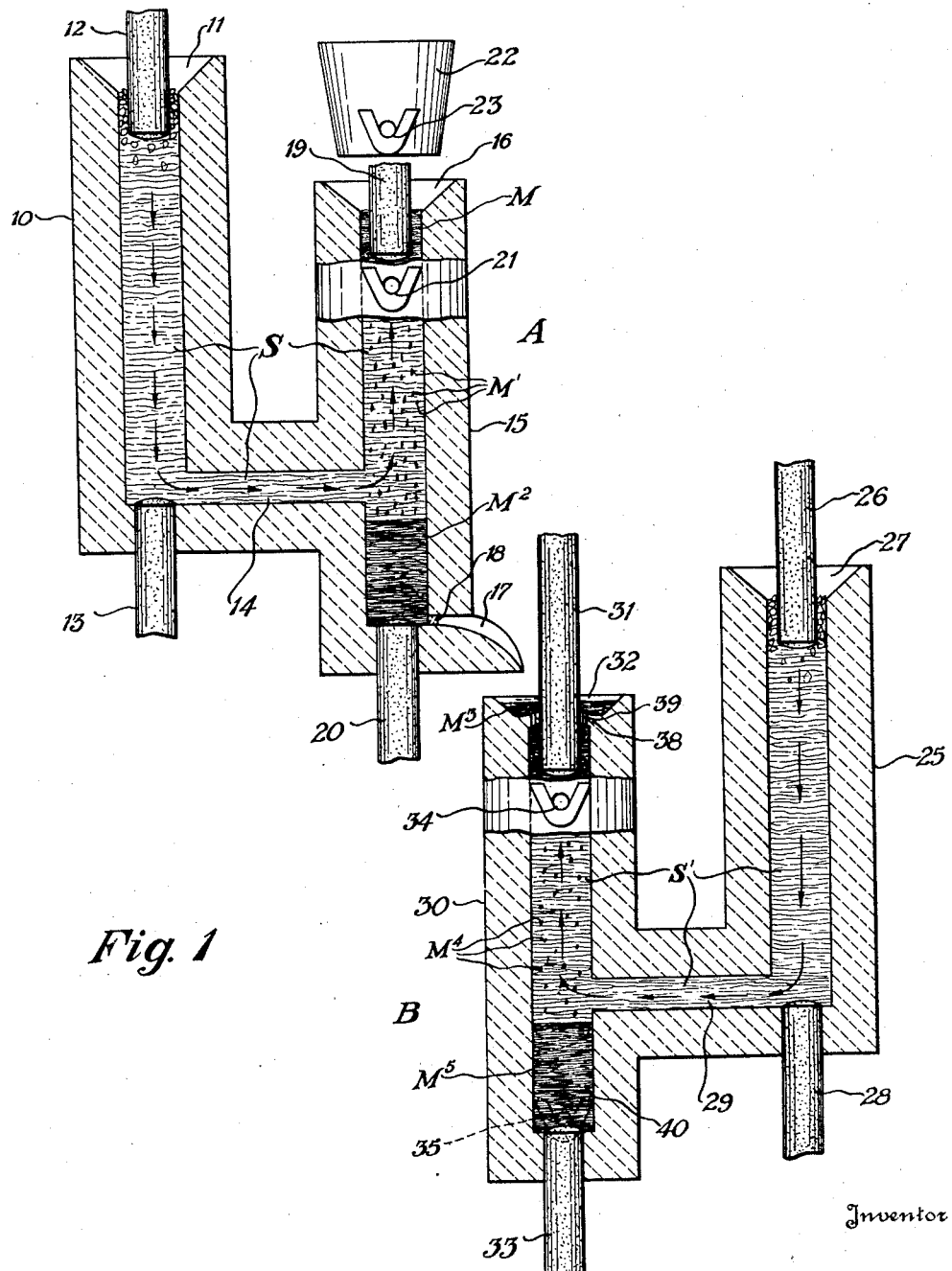

Jan. 17, 1933.  T. F. BAILY  1,894,657
METHOD AND APPARATUS FOR REFINING METALS
Filed Aug. 12, 1929  3 Sheets-Sheet 1

Inventor
T. F. Baily
By Harry Fresse
Attorney

Jan. 17, 1933.   T. F. BAILY   1,894,657
METHOD AND APPARATUS FOR REFINING METALS
Filed Aug. 12, 1929   3 Sheets-Sheet 2

Inventor
T. F. Baily
By Harry Frease
Attorney

Patented Jan. 17, 1933

1,894,657

UNITED STATES PATENT OFFICE

THADDEUS F. BAILY, OF ALLIANCE, OHIO

METHOD AND APPARATUS FOR REFINING METALS

Application filed August 12, 1929. Serial No. 385,113.

The invention relates to the melting, refining and purifying of metals, and the reduction of ores and more particularly to the passing of the molten metal or ores through molten slag whereby all portions of the metal to be refined or ore to be reduced are immediately brought into contact with the slag in order to rapidly carry on the metallurgical operation.

The object of the improvement is to provide means whereby molten steel or ferro-alloys may be taken direct from a blast furnace, open hearth furnace, crucible or other source and poured through a column of slag maintained in molten condition by the passage of an electric current therethrough, the column of slag forming a molten resistor which maintains the metal in molten state and purifies and refines the same as it passes through the slag.

Another object is to melt light scrap or other metals by placing the metal in the top of the furnace where it may be melted by the slag resistor, or by raising the upper electrode the metal may be melted by the arc as it lies on top of the slag or partially submerged therein, the molten metal passing down through the molten slag resistor for refining or other metallurgical operations.

Another object of the improvement is to provide for passing the molten slag resistor upward through the furnace counter to the flow of the descending molten metal, the impurities taken up in the slag rising to the top of the furnace and overflowing into a slag pot or other suitable receptacle.

A further object is the provision of means whereby the molten metal to be refined is first passed through a molten resistor formed of an oxidizing slag and then discharged into a molten resistor formed of a reducing slag through which the metal is passed.

A still further object is to reduce ores or oxides by placing them, together with coke or other suitable reducing agent, upon the top of a molten slag resistor composed of calcium carbide or other strong reducing slag, the ore being reduced and passed down through the molten slag where it may be refined or otherwise treated.

A still further object of the improvement is the provision of a continuous refining equipment wherein new slag is made continuously in a chamber connected to the refining or melting chamber, the lower end of the slag making chamber being connected to the lower portion of the melting or refining chamber, slag being melted in the upper part of the slag making chamber and maintained molten and at the correct temperature for introduction into the melting chamber at the desired rate, the slag level of the slag making chamber being maintained at a sufficient elevation above the overflow or slag spout of the refining or melting chamber so that for any given quantity and quality of metal to be melted or refined, or ore to be reduced, the feeding of new slag making material to the slag making chamber will automatically provide sufficient slag of the right temperature and composition to refine or melt the metal or reduce the ore in the refining or melting chamber, whereby not only is the slag making continuous but the refining, melting or reducing operation may be carried on continuously.

Figure 2:
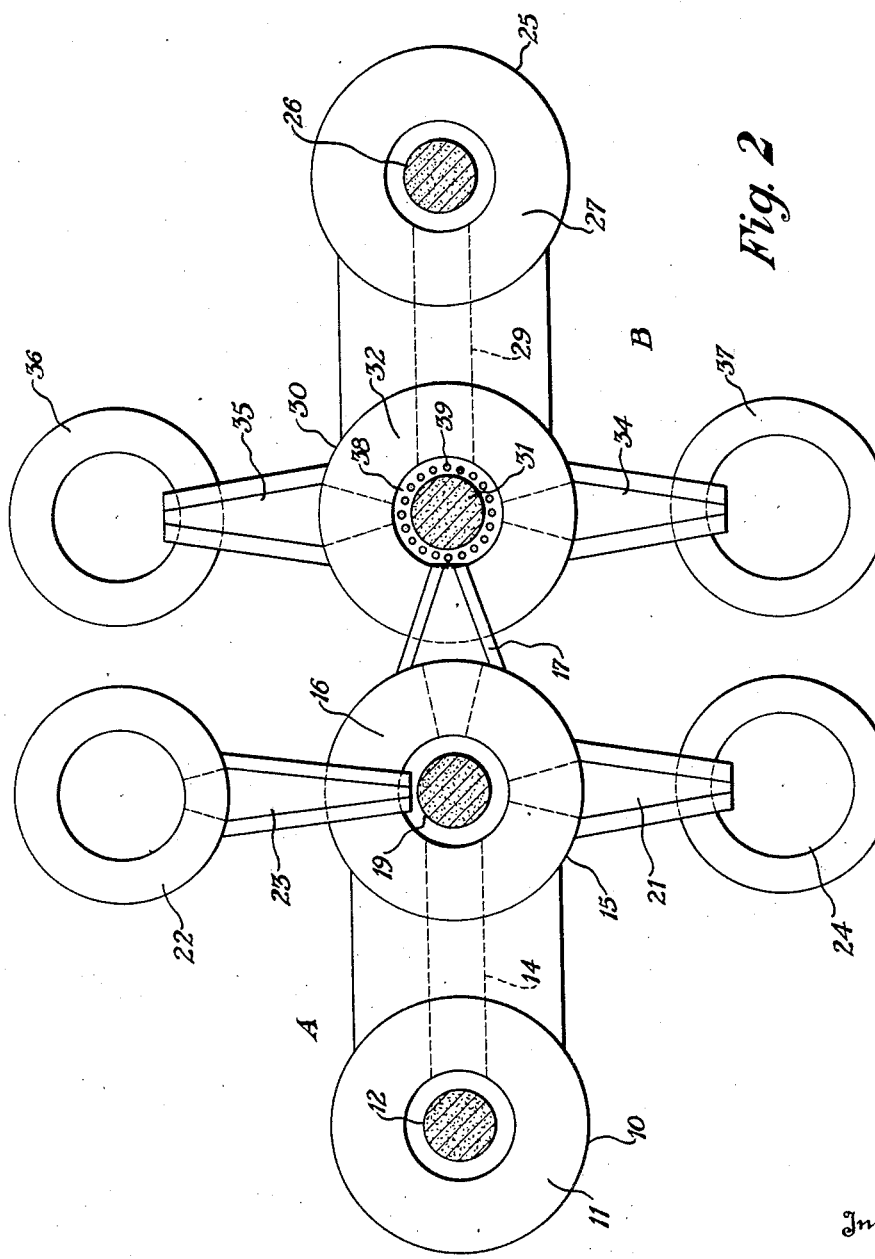

An embodiment of the invention thus set forth in general terms is illustrated in the accompanying drawings, in which Figure 1 is a vertical sectional view through apparatus designed to carry out the improved process;

Fig. 2, a top plan view of the same; and

Figure 3:
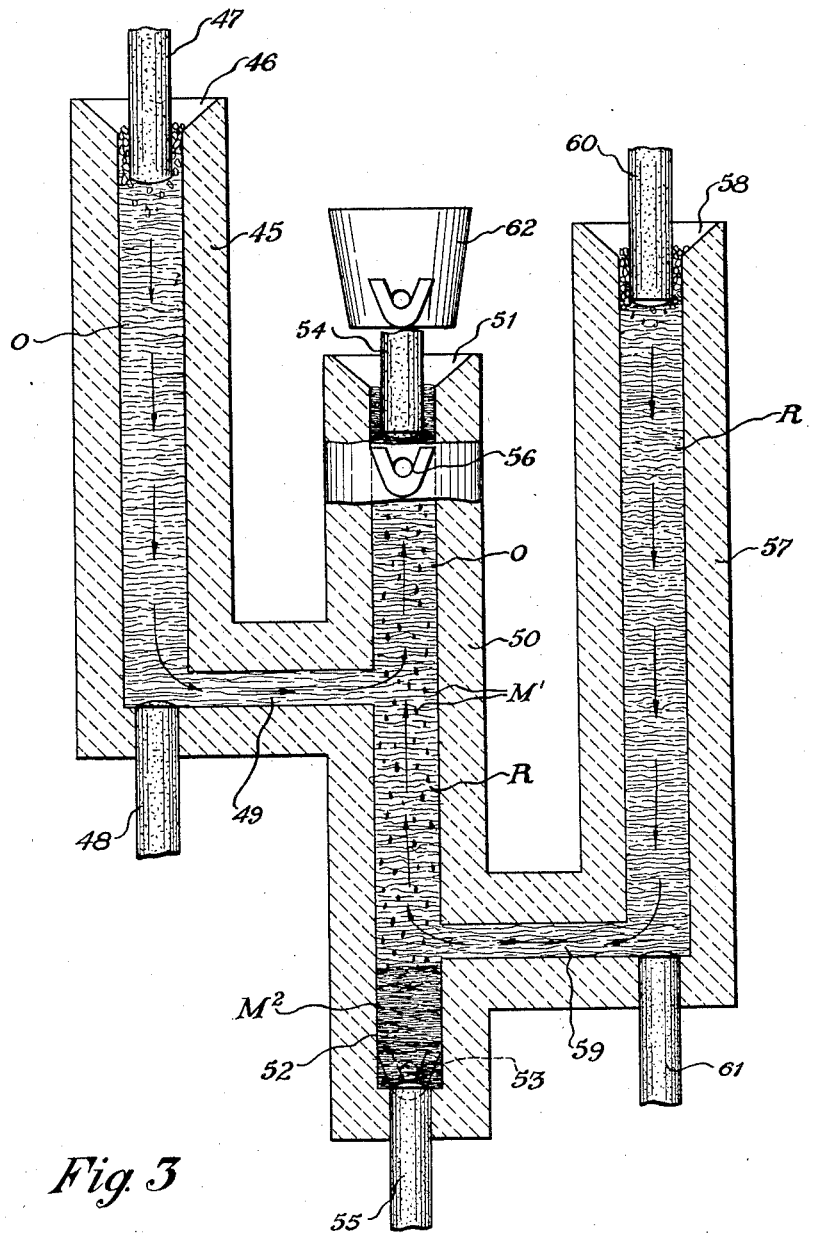

Fig. 3, a modified form of the apparatus.

Similar numerals refer to similar parts throughout the drawings.

Apparatus for carrying out the invention is shown more or less diagrammatically in the drawings and includes broadly two substantially similar units shown generally at A and B. The upper unit A includes an upright shaft 10 formed of suitable refractory material having the upper open end 11 into which is extended an electrode 12.

A similar electrode 13 is located in the lower end of the shaft 10, which is closed excepting for an angular passage 14 which communicates with the upright shaft 15, at a point spaced from the lower end thereof.

The upper open end 16, of the shaft 15, terminates at a point below the top of the shaft 10, while the lower end thereof extends substantially the same distance below the bottom of the shaft 10 and is provided with a pouring spout 17 which may be temporarily closed if desired, as by the plug 18.

An electrode 19 extends into the upper open end of the shaft 15 and a similar electrode 20 is located in the lower end thereof. An overflow spout 21 may be provided at a point spaced below the upper end of the shaft 15.

The electrodes are so wired that the upper and lower electrodes 12 and 13 respectively in the shaft 10 may be operated in a circuit and the upper and lower electrodes 19 and 20 respectively may be operated in another circuit, or if desired, the electrode 13 may be cut out and current passed directly from the upper electrode 12 in the shaft 10 to the lower electrode 20 in the shaft 15; or both of the lower electrodes 13 and 20 may be cut out and current passed from the upper electrode 12 through the shaft 10, passage 14 and shaft 15 to the upper electrode 19.

In operating the upper unit A for refining metal, an oxidizing slag, which may be composed of iron oxide and lime, is placed in the shaft 10 and melted by passing electric current through the slag between the electrodes 12 and 13. As the slag is melted, it will pass through the passage 14 to the shaft 15 and additional slag is added to the shaft 10 and melted until the slag level in the shaft 15 reaches the overflow spout 21.

Current is passed through the slag in the shaft 15 between the electrodes 19 and 20 and molten steel or alloy to be refined is poured into the ladle 22, being discharged from the pouring spout 23 thereof into the upper open end 16 of the shaft 15.

The molten metal, as indicated at M, will pass downward through the slag indicated at S, being broken up into small drops by the passage of the electric current therethrough, passing down through the slag in the shaft 15, as indicated at M' and collecting in the lower end of the shaft 15, below the slag, as shown at M².

Additions may be made to the slag in the upper end of the shaft 10 as required to cause a steady flow of slag downward in the shaft 10, through the passage 14 and upward in the shaft 15, in the direction of the arrows shown in Fig. 1, overflow of slag being discharged through the overflow spout 21 into a slag pot or the like, as indicated at 24.

The lower unit B may be substantially similar to the upper unit above described and includes the upright shaft 25 having an upper electrode 26 extended into the upper open end 27 thereof and a lower electrode 28 located in the lower end.

An angular passage 29 communicates with the lower end of the shaft 25 and with the substantially parallel shaft 30 at a point spaced from the lower end thereof.

A shaft 30 is provided with an electrode 31 extended into the upper open end 32 thereof and with the lower electrode 33 located at its lower portion.

A slag overflow spout 34 may be provided near the upper end of the shaft 30 and a metal pouring spout 35 may be provided at its lower end.

Calcium carbide or other suitable reducing slag is melted in the shaft 25 by the passage of electric current between the electrodes 26 and 28 and the shafts 25 and 30, as well as the angular passage 29, are filled with this molten slag, as indicated at S'.

The slag in the shaft 30 is maintained molten by the passage of electric current therethrough between the electrodes 31 and 33. The slag thus becomes a molten resistor element in the same manner as the slag in the unit A.

The molten metal M² may be tapped from time to time from the spout 17, or if desired may run continuously therefrom into the upper open end of the shaft 30, as indicated at M³, passing downward through the slag in said shaft in small drops, as indicated at M⁴ and collecting in the bottom of the shaft, below the slag, as shown at M⁵, where it may be tapped from the pouring spout 35 at intervals, or run continuously therefrom, if desired, into a ladle or the like indicated at 36.

Additional slag may be added to the shaft 25, as desired, to keep the slag continually flowing downward through the shaft 25, through the angular passage 29 and upward through the shaft 30, as shown by the arrows on Fig. 1, the slag with the impurities therein overflowing through the overflow spout 34 and being discharged into a slag pot or the like, as shown at 37.

For the purpose of breaking up the stream of metal into globules or small particles, a strainer may be formed in the upper end of the refining and melting furnace, as shown at 38, upon the oxidizing unit B. As the molten metal is poured into the strainer cup it will be broken up into globules by passing through the apertures 39 therein.

For the purpose of illustration the invention is above described for refining of metals but it should be understood that light scrap or the like may be melted, or ores or the like may be melted and reduced with this apparatus, it being understood that by feeding light steel scrap, ores or the like at the proper rate, the slag where it comes into contact with the cold materials has a tendency to congeal and offer a better support to hold the material to be melted until it becomes fluid, and the cooling of the slag, due to the cold incoming material, greatly increases its electrical resistance, and with the proper control of the electric current and sufficient voltage maintained to drive the desired amperage through the molten slag resistor to maintain the main length of the resistor at the desired temperature the additional voltage to compensate for the cooled resistor at the top, due to the cold incoming material, the extra power is dissipated directly into the upper portion of the resistor where it is most needed and desired.

It should be understood that the several chambers of the furnace should be lined with a refractory of low electrical conductivity and high melting point, so that a minimum of current will be carried by the refractory lining which should also be of such chemical composition as to not be materially fluxed by contact with the molten slag resistor.

When reducing ores or making ferro-alloys wherein it is desirable not only to reduce but to also refine the metal, a reducing agent such as carbon can be charged in the top of the refining and melting chamber with the ore or the like, and the necessary heat for reduction supplied by increasing the voltage and drawing an arc, or by feeding material in such a manner and at such a rate as to maintain an electric current by resistance through the molten or semi-molten material being reduced, balancing the voltage so as to maintain the necessary heat input for reduction.

The slag produced from the reduction operation may be allowed to run off at the slag overflow, the freed reduced metal descending through the molten slag resistor for further purification and refining. In this manner a less amount of purifying slag will be required than would be the case if all of the slag making and purifying materials were charged with ore or oxides to be reduced.

Since in this apparatus better control of the making and maintaining of the slag is possible, both as to composition, temperature and fluidity, without resorting to materials which in themselves have no beneficial metallurgical properties, but are used only to assist in fluidity, such as the addition of silica to a lime slag to keep it fluid, it is possible to make large savings in refining metals.

For instance, in the deoxidizing operation, where undesirable oxides are reduced by means of manganese and silicon, which in the reduction operation become oxides themselves and pass into the slag and are lost, by this new process, in the deoxidizing operation, a slag much higher in carbide or made from pure carbide, can be made and fed into the deoxidizing furnace and the entire deoxidation of the metal performed by the carbide slag, eliminating the use of the expensive silicon and manganese additions.

In the usual refining operations in existing types of furnaces in steel manufacture, the oxidation of the elements proceeds as follows: A certain proportion of FeO encountering the manganese and silicon, the oxide is reduced and Fe liberated and returned to the bath while the oxide of the iron combines with the manganese and silicon, forming MnO plus $SiO_2$.

Other particles of FeO, after the manganese and silicon have been oxidized from the bath, then attack the phosphorus, forming phosphoric anhydride, ferrous phosphorus and tri-calcium phosphate, it being understood that sufficient lime is present in oxidizing the FeO.

In the new process these operations may be regarded as taking place continuously, each in a distinct part or level of the furnace, that is the oxidation of the manganese and silicon will take place at the top of the furnace shortly after the metal starts down through the slag, the metal then freed of these two elements, but still containing phosphorus, passing down to where the slag resistor is not contaminated with the extra manganese and silicon oxides formed by the deoxidation operation above mentioned, but meeting fresh slag having greater affinity for phosphorus because of its lack of contamination, and continuing downward, always meeting purer and more active slag.

Carbon is generally one of the last elements to be oxidized and removed, and this operation may take place in a still lower portion of the slag resistor, and again, since it meets more active slag, less contaminated by other elements, it is possible to economically and readily reduce the carbon content much lower than by any other metallurgical equipment or process.

It is thus to be noted that by the improved apparatus and process it is possible to control the metallurgical operations in a manner not possible by existing equipment, maintaining strongly oxidizing conditions in the calcium slag used for refining, until the metal has passed into the settling basin 40 of the oxidizing furnace.

The last of the slag through which the metal has passed contains iron oxide and calcium oxide and even if some iron oxide remains with the refined metal, the second operation or that carried on in the deoxidizing furnace B has no function to perform except reduction of the iron oxide, all other contaminating elements having been previously removed.

It should be noted that as the metal and slag pass substantially continuously in opposite directions, as the metal becomes more refined it meets increasingly purer and more actively refining slags, so that by this method, for a given metal purity, a lesser slag volume is required than in the ordinary operation where the entire volume of slag in the furnace at any one time is of the same analysis or contamination.

Another improvement in this new method is that the slag volume in contact with the purified metal is not in contact with the air, and therefore is not subject to the effect of oxidation which is the case in other furnaces, even in the electric furnace where the depth of slag is frequently only one or two inches, thus exposing an enormously large area of slag surface to the atmosphere compared to the total mass of slag.

It is well known that the atmosphere in contact with the slag affects its chemical properties as well as the losses due to volatilization at high temperatures, while in the present equipment not only is the slag maintained without the heating by an arc, as common in most electric furnaces, but it is kept heated entirely by resistance, thus reducing volatilization to a minimum, and the slag immediately after becoming molten and up to the time when it is finally ejected from the furnace, is not in contact with air or gases other than those to be found actually in the metals or ores under treatment or in the slag itself.

If desired the apparatus may be constructed in the manner shown in Fig. 3 in which the oxidizing slag and reducing slag may be both admitted at different levels into a single heating or refining shaft so that the descending globules of metal pass first through the oxidizing slag and then through the reducing slag in a continuous operation.

In this form of the invention the apparatus may include a shaft 45 formed of suitable refractory material for melting oxidizing slag.

This shaft has the upper open end 46 into which is extended the movable upper electrode 47, a lower electrode 48 being located in the lower end of the shaft, which is closed excepting for the angular passage 49 which communicates with the melting or refining shaft 50 at a point spaced from the upper end thereof.

The upper open end 51, of the shaft 50, terminates at a point below the top of the shaft 45, while the lower end thereof terminates at a considerable distance below the bottom of the shaft 45, having the settling basin 52 at its bottom portion provided with a pouring spout 53 which may be temporarily closed if desired as by a plug such as used in ordinary practice.

An electrode 54 extends into the upper open end of the shaft 50 and a lower electrode 55 is located in the lower end thereof. The overflow spout 56 may be provided at a point intermediate the top of the shaft 50 and the angular communication 49 for the overflow of slag from the shaft.

A shaft 57, of suitable refractory material, may be provided for the melting of a reducing slag, the upper open end 58 of said shaft terminating at a point above the top of the shaft 50 while the lower end thereof is provided with an angular communicating passage 59 which communicates with the shaft 50 just above the settling basin 52 thereof.

An upper electrode 60 is extended into the upper open end 58 of the shaft 57 and the lower electrode 61 is located in the lower end thereof.

Suitable oxidizing slag indicated at O is melted and maintained molten in the shaft 45 and suitable reducing slag, as indicated at R is melted and maintained molten in the shaft 57, the slags passing down through the respective shafts, and through the respective angular passages into the melting and refining shaft 50, each slag then passing upward through the shaft 50 to the overflow spout 56 thereof. As the reducing slag passes up above the point of communication with the angular passage 49, it mixes with the oxidizing slag and becomes oxidizing itself.

The metal to be melted or refined is placed in the upper open end of the shaft 50, being preferably poured therein as from the ladle 62 if in molten condition, and passes downward first through the oxidizing slag and then through the reducing slag in the form of small globules as shown at M' in Fig. 3 collecting in the settling basin 52 in the purified form as indicated in M2 in said figure.

The operation may be otherwise as described in connection with the form of the invention shown in Fig. 1 and 2.

In carrying out the process in the apparatus shown in Fig. 3 both the oxidizing slag and reducing slag may be calcium slags. For instance, the oxidizing slag may be composed of CaO and $Fe_2O_3$, while the reducing slag may be composed of CaO, Coke and $CaF_2$. Thus as the reducing calcium slag rises up above the level of the oxidizing calcium slag it mixes with the same and is used in the making of the oxidizing slag through which the metal first passes.

In the form of the invention illustrated in Fig. 3, it should be understood that instead of melting oxidizing slag in the shaft 50, the process may be carried out by melting therein suitable oxidizing material to mix with the ascending reducing slag to form an oxidizing slag; or if desired the reducing slag may be changed to oxidizing slag by blowing air into the same, at this point, oxidizing a sufficient portion of the iron in the slag to change the same to an oxidizing slag.

I claim:

1. The process of purifying ferrous metal by oxidation, which consists in passing molten ferrous metal having oxidizable impurities therein, downward through a molten oxidizing slag resistor column and moving the molten slag upward counter to the flow of molten metal.

2. The process of purifying ferrous metal which consists in passing molten ferrous metal downward through a molten oxidizing slag resistor column and moving the molten oxidizing slag upward counter to the flow of the molten metal and then passing the molten metal downward through a molten reducing slag resistor column.

3. The process of purifying ferrous metal which consists in passing molten ferrous metal downward through a molten oxidizing slag resistor column and moving the molten oxidizing slag upward counter to the flow of the molten metal and then passing the molten metal downward through a molten reducing slag resistor column, and moving the molten reducing slag upward counter to the flow of the molten metal.

4. The process in the refining of steel with an oxidizing calcium slag and a reducing calcium slag which consists in passing the reducing calcium slag into the oxidizing calcium slag and using it in the making of the oxidizing calcium slag.

5. The process of reducing oxides which consists in passing the material downward through an electrical resistor comprising an upper portion of oxidizing slag and a lower portion of reducing slag, causing the slag from the reduction operation to pass off without descending to the bottom of the resistor and continuously feeding a reducing slag in at the bottom of the resistor for purification of the reduced material.

6. The process of purifying metals and the like, which consists in passing a molten reducing slag upward through a chamber, changing the slag to an oxidizing slag at a point within and spaced from the bottom of the chamber, and passing metal downward through the oxidizing slag and then through the reducing slag.

In testimony that I claim the above, I have hereunto subscribed my name.

THADDEUS F. BAILY.